United States Patent [19]

Beaverson et al.

[11] Patent Number: 5,079,930
[45] Date of Patent: Jan. 14, 1992

[54] APPARATUS AND METHOD FOR MONITORING REFRIGERATION SYSTEM

[75] Inventors: David W. Beaverson, Bowling Green; David A. Clay, Perrysburg, both of Ohio

[73] Assignee: Atron, Inc., Toledo, Ohio

[21] Appl. No.: 621,609

[22] Filed: Dec. 3, 1990

[51] Int. Cl.⁵ .............................................. F25B 49/02
[52] U.S. Cl. ....................................... 62/129; 62/200; 62/513
[58] Field of Search ................. 62/125, 126, 127, 129, 62/113, 513, 511, 200

[56] References Cited

U.S. PATENT DOCUMENTS

| | | | |
|---|---|---|---|
| 3,410,102 | 11/1968 | Karsten | 62/129 |
| 3,415,070 | 12/1968 | Weum | 62/129 |
| 3,491,544 | 1/1970 | Webber | 62/77 |
| 3,651,863 | 3/1972 | Hughes | 62/129 X |
| 3,677,334 | 7/1972 | Bathla et al. | 62/129 X |
| 4,138,879 | 2/1979 | Liebermann | 73/19 |
| 4,161,106 | 7/1979 | Savage et al. | 62/115 |
| 4,167,858 | 9/1979 | Kajima et al. | 62/126 |
| 4,328,678 | 5/1982 | Kono et al. | 62/126 |
| 4,328,682 | 5/1982 | Vana | 62/196 B |
| 4,376,510 | 3/1983 | Allard | 62/129 X |
| 4,545,212 | 10/1985 | Noda | 62/129 |
| 4,644,755 | 2/1987 | Esslinger et al. | 62/126 |
| 4,711,096 | 12/1987 | Krantz | 62/129 |
| 4,745,765 | 5/1988 | Pettitt | 62/129 |

Primary Examiner—Harry B. Tanner
Attorney, Agent, or Firm—Marshall & Melhorn

[57] ABSTRACT

A flash gas filter system detects a low level of refrigerant flowing in a conduit of a refrigeration system by measuring a temperature drop across a sub-cooler connected to the conduit. The sub-cooler has a liquid process circuit for passing the refrigerant and a refrigerating circuit connected by a manual expansion valve to an outlet of the liquid process circuit for producing a predetermined temperature drop across the sub-cooler when the refrigeration system is fully charged. The temperature drop in the refrigerant is reduced by the presence of bubbles caused by a low refrigerant level. The reduced temperature drop is detected and an alarm signal is generated by a computerized filter system control. The control also can monitor liquid line temperature for protection against malfunctioning condensers generate maintenance information and warn of potential malfunction conditions.

16 Claims, 2 Drawing Sheets

APPARATUS AND METHOD FOR MONITORING REFRIGERATION SYSTEM

BACKGROUND OF THE INVENTION

The present invention relates generally to an apparatus and method for monitoring a refrigeration system and, in particular, to an apparatus and method for sensing and indicating a low refrigerant condition in a refrigeration system.

In typical refrigerators, a refrigerant is repeatedly cycled alternately liquefying by condensation and gasifying by evaporation within a refrigeration circuit. A refrigerator will cool an enclosed area by removing heat from the air therein with an evaporator after the liquid refrigerant is gasified by passing through an expansion valve. Refrigerators are provided with a refrigerant compressor which compresses the low pressure vapor evaporated refrigerant into a high pressure superheated vapor form which is discharged to a condenser for removal of the heat and liquefying.

If the refrigerant leaks from the refrigeration circuit causing a reduction in the amount of the refrigerant in the circuit, the compressor will likely overheat. Particularly, in the event misty oil included in the refrigerant is expected to function as a lubricant the compressor will undergo a lubrication shortage causing a seizure of the compressor. To prevent a compressor seizure, the operation of the compressor must be stopped when the refrigerant leaks below a predetermined safety level. Three known ways of sensing refrigerant loss are: 1) to sense the refrigerant temperature, which rises in response to a decrease in the amount of refrigerant; 2) to sense the temperature of an oil pan disposed in the bottom portion of the compressor to detect a decrease of the enclosed refrigerant; and 3) to observe bubbles in a sightglass located in the liquid line of a refrigeration system. When a sightglass is utilized, such an observation can be misleading as flash gas bubbles occur even when the refrigeration system is not low on refrigerant.

A variety of known refrigeration monitoring systems measure the temperature of the refrigerant to detect a low refrigerant condition. U.S. Pat. No. 3,415,070 discloses a refrigeration warning system having a chamber surrounding a refrigerant liquid header connected between a condenser and a refrigeration unit evaporator. A small amount of the refrigerant entering the header is diverted to the chamber. When the supply of liquid refrigerant is reduced, a temperature rise in the top of the chamber caused by the presence of gas rather than liquid is detected by an externally mounted temperature sensor for energizing an alarm.

SUMMARY OF THE INVENTION

The present invention concerns a monitoring apparatus and method utilized in a refrigeration system to generate a warning signal indicating a low refrigerant condition. The apparatus monitors the condition of refrigerant in a liquid line connected between the condenser and the expansion valve of the refrigeration system. A sub-cooler is installed in the liquid line and has a liquid process circuit for passing the liquid refrigerant. At an outlet of the sub-cooler liquid process circuit, a return line, having a solenoid valve and a manual expansion valve (MXV) connected in series therewith, returns a small portion of the liquid refrigerant to an inlet of a refrigerating circuit of the sub-cooler. A refrigerating circuit outlet is connected to a suction manifold or suction line connected to the inlet side of a compressor in the system.

In the sub-cooler, a heat exchange occurs between the liquid and refrigerating circuits causing a BTU removal from the refrigerant passing through the liquid process circuit. A pair of transducers are utilized to measure if any temperature drop occurs across the sub-cooler. The temperature drop or $\Delta t$ can be set at approximately 6–10° F. by adjusting the manual expansion valve in the return line when the system is properly charged and operating under full load conditions.

The sub-cooler and the manual expansion valve function as a flash gas filter to convert any flash gas in the refrigerant to a liquid form. The manual expansion valve provides a constant refrigerating effect and, once the flash gas is liquified, the remainder of the refrigerating effect results in sub-cooling of the refrigerant which is detected by the transducers as the above identified temperature drop. When refrigerant is lost from the system, heat laden low on gas (LOG) bubbles form and the flash gas filter attempts to liquify them by the above mentioned refrigerating effect. Since there is not enough refrigerating effect to convert all these LOG bubbles into liquid, the temperature drop approaches zero and an alarm signal is generated after an appropriate time delay.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
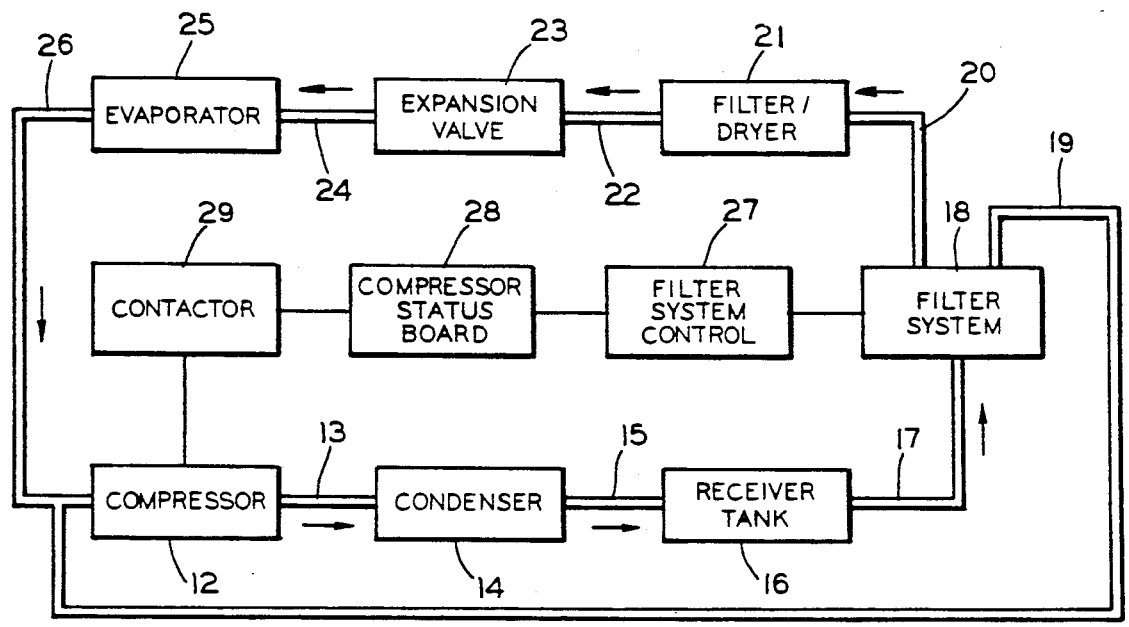
FIG. 1 is a block diagram of a refrigeration system incorporating a refrigeration monitoring apparatus in accordance with the present invention.

Referring to FIG. 1, there is illustrated a typical refrigeration system 11 incorporating the refrigeration monitoring apparatus in accordance with the present invention. In the refrigeration system 11, a refrigerant is repeatedly cycled alternately liquefying by condensation and gasifying by evaporation within a refrigeration cycle. In today's commercial refrigeration market, refrigeration systems use a variety of valves and control devices. The following is a simplified description of a typical refrigeration system.

A compressor 12 delivers hot, compressed, gaseous refrigerant from an outlet through a hot gas discharge conduit 13 to an inlet of a condenser 14. The condenser 14 liquifies the refrigerant by a suitable cooling means preferably utilizing ambient air or water. The condenser 14 delivers the liquid refrigerant from an outlet via a liquid line or conduit 15 to a receiver tank 16. From the receiver tank 16, the refrigerant flows through liquid line or conduit 17 to a flash gas filter system 18 according to the present invention. The filter system 18 discharges the liquid refrigerant through a liquid line or conduit 20 to a filter/dryer 21.

The filter/dryer 21 removes moisture from the refrigerant and discharges the refrigerant through a liquid line or conduit 22 to an expansion valve 23. The expansion valve 23 reduces the pressure of the liquid refrigerant prior to passage through a liquid line or conduit 24 to an evaporator 25. In the evaporator 25, the refrigerant is transformed into a gaseous state by withdrawing heat from a load to be cooled, preferably air or water. The gaseous refrigerant exiting the evaporator 25 through a suction line or conduit 26 flows back to the inlet of the suction manifold or suction line connected to the inlet of the compressor 12 where the refrigeration cycle is repeated.

The flash gas filter system 18 converts refrigerant vapor (flash gas) having a relatively low heat content into liquid refrigerant thereby filtering all flash gas from the liquid in the liquid line. The remaining refrigerating effect sub-cools the liquid refrigerant in the liquid line. The filter system 18 also vents the refrigerant used to liquify the bubbles through a suction line conduit 19 suction manifold or suction line to the inlet of the compressor 12 where the refrigerant reenters the refrigeration system.

The refrigerant used in the refrigeration system 11 typically is a chemical compound refrigerant that has a high latent heat of vaporization. The latent heat of vaporization is the amount of heat necessary to change a liquid into a gas without changing the temperature of the liquid or the gas. A "refrigerating effect" occurs when the refrigerant changes state from liquid to vapor by absorbing heat (without changing temperature).

Figure 2:
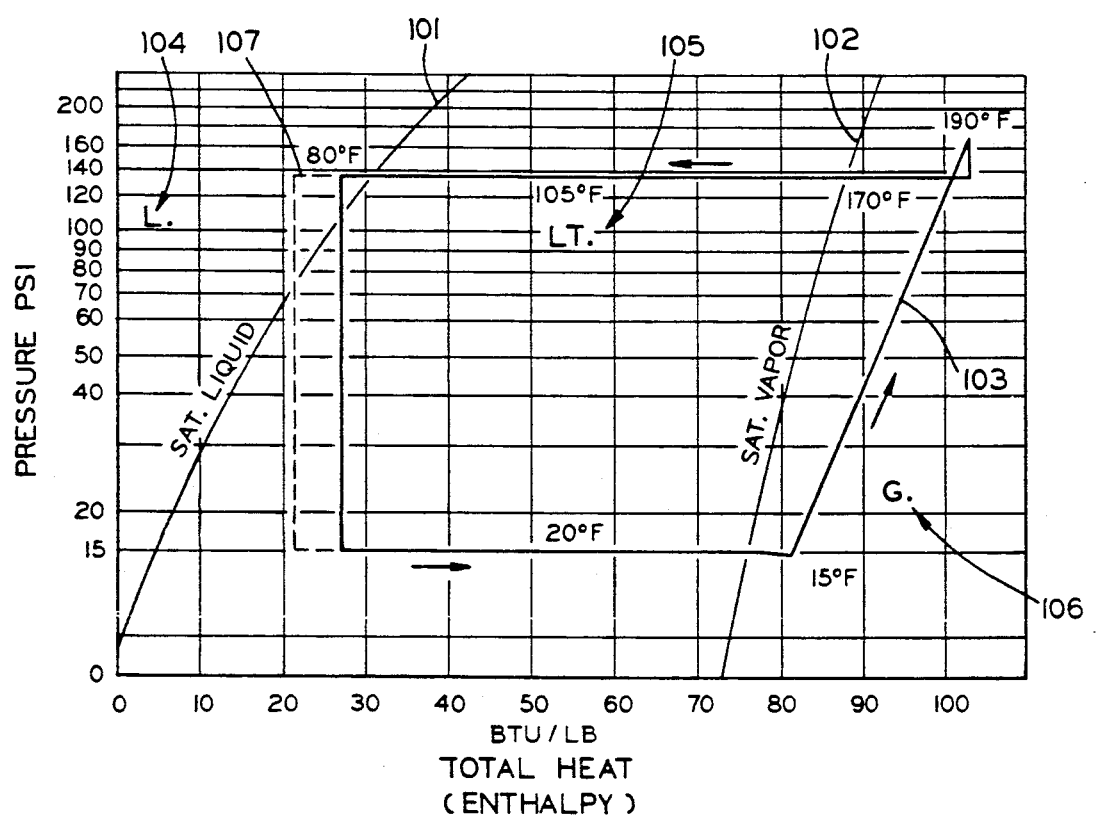
FIG. 2 is a pressure versus enthalpy diagram for the refrigeration system shown in FIG. 1.

The refrigerant in the refrigeration system 11 can be in one of three conditions at any given time. FIG. 2 shows the three conditions of refrigerant, separated by a liquid saturation curve (SAT. LIQUID) 101 and a saturated vapor curve (SAT. VAPOR) 102, on a pressure-enthalpy diagram. A typical refrigeration cycle is also shown as a closed loop 103. The three conditions are (L) Liquid 104, (LT) Mixture of Liquid and Gas (latent) 105 and (G) Gas 106.

In the complete liquid (L) condition, any heat removed from the liquid lowers the temperature or sub-cools the liquid (assuming the liquid remains at constant pressure). For example, a dashed line 107 shows sub-cooling which lowers the refrigerant temperature at a constant pressure. In the complete gas (G) or vapor condition, any heat added (when a constant pressure is maintained) will result in an increase of temperature or superheating the gas. When liquid and gas are present together in a mixture condition (LT), heat removed or added (under a constant pressure), does not result in a temperature change but does change the liquid/gas ratio. A higher heat content of the mixture condition exists if the mixture is close to the saturated vapor curve. A lower heat content of the mixture condition exists if the liquid/gas mixture is closer to the saturated liquid curve.

Removing heat from refrigerant vapor that has a low amount of superheating (close to the saturated vapor curve) causes the refrigerant to start condensing into a liquid (under a constant pressure) and cross into the mixture condition. Adding heat to liquid refrigerant with very little sub-cooling (close to the saturated liquid curve) causes the refrigerant to start to vaporize into a gas state (under a constant pressure) and cross into the mixture condition.

In a properly charged refrigeration system, the liquid line or conduit typically contains refrigerant in liquid and mixture conditions. In an under-charged refrigeration system only the mixture condition refrigerant is present. In both instances, the mixture condition refrigerant can be observed as bubbles in a sightglass installed in the refrigerant line of the system. Since both liquid and mixture condition refrigerant can be observed in the sightglass of a refrigeration system that is properly charged, the presence of bubbles cannot be used to conclude the refrigeration system in undercharged, even though bubbles always occur in a system that is undercharged.

The refrigeration monitoring system of the present invention operates on the principle that the mixture condition refrigerant, present when the refrigeration system is properly charged, contains a relatively small amount of heat, and is close to the liquid saturation curve on the pressure versus enthalpy diagram. This type of mixture condition refrigerant is hereafter referred to as flash gas. Conversely, in an undercharged refrigeration system, there is only mixture condition refrigerant present, and this type of mixture condition refrigerant has a relatively high heat content and is closer to the saturated vapor curve. This type of mixture condition refrigerant is hereafter referred to as low on gas (LOG) refrigerant.

Flash gas is caused by slightly sub-cooled liquid refrigerant experiencing a pressure drop and/or taking on additional heat. The refrigeration system control valves, piping, changing cooling loads and outside ambient temperature changes, are all possible causes of flash gas.

Low on gas refrigerant bubbles only occur when there is a loss or partial loss of the liquid seal in the receiver, or in the condenser if the receiver is bypassed. The loss of the liquid seal is most likely caused by the loss of refrigerant through a leak in the refrigeration sealed system piping. However, loss of the liquid seal can also be attributed to undercharging the refrigeration system. This undercharge often occurs by not allowing additional refrigerant to be added to the system for winter operation when charging the system in warm weather. An extra charge must be added to the refrigeration system to allow proper operation at the coldest ambient temperature the condenser will experience during the winter months.

When the refrigeration system is fully charged, the sightglass will reveal either clear liquid or flash gas bubbles. When the refrigeration system is low on refrigerant the sightglass will show low on gas bubbles.

The system 11 employs a filter system control 27 which provides an alarm for low refrigerant levels, failure of the compressor 12 and failure of the condenser 14. The filter system control 27 includes three input sources that provide information to a computer (not shown) within the filter system control 27. The first input source is the flash gas filter system 18 which generates an electrical signal indicating the condition of the refrigerant within the refrigeration system liquid line. The second input source is a compressor status board 28 which generates an electric signal providing information on the operation of the compressor 12 or compressors. An input of the compressor status board 28 is wired in parallel with a coil of a compressor contactor 29. The contactor is connected between a source of electrical power (not shown) and an electric motor (not shown) driving the compressor. The compressor status board 28 monitors the operation of the contactor 29 to signal when the compressor 12 is operating. The third source is the inlet temperature signal from the flash gas filter system. This signal provides an input for the detection of malfunctioning condensers.

Figure 3:
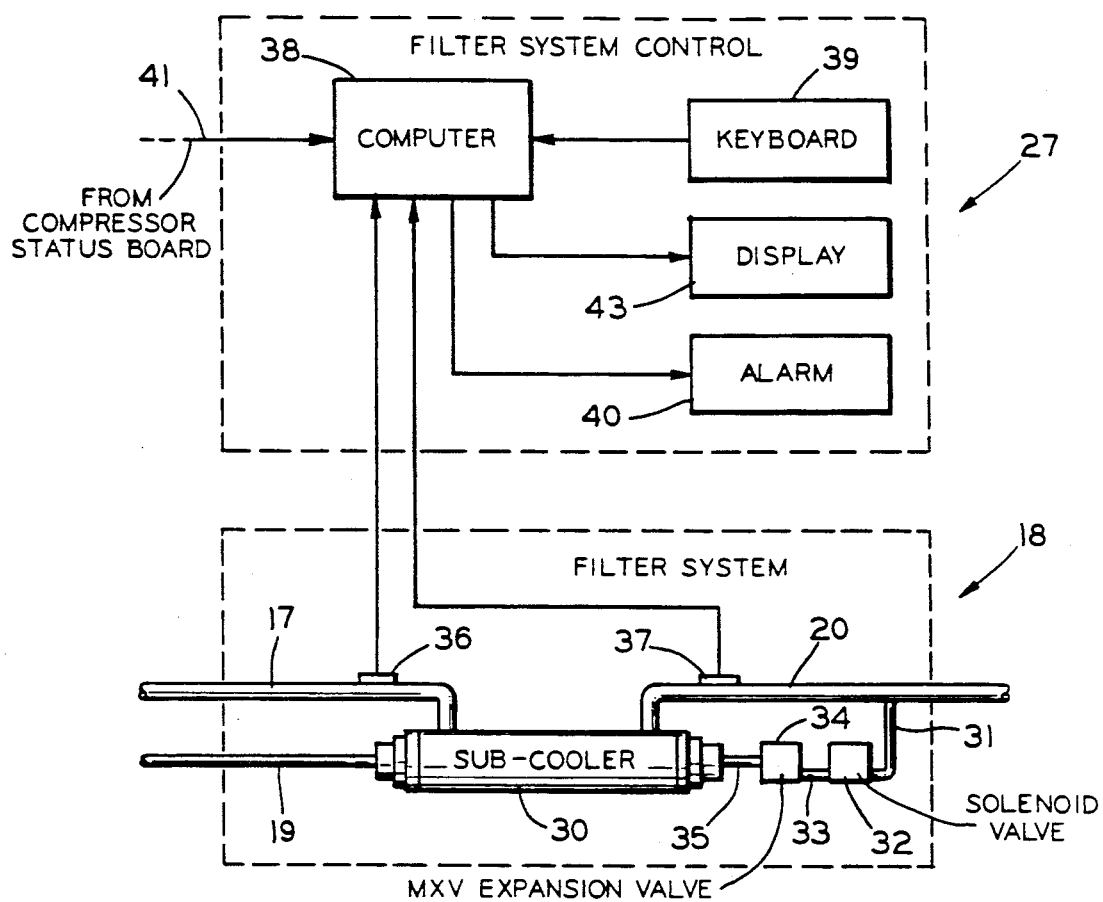
FIG. 3 is a block diagram of the flash gas filter system and filter system control shown in FIG. 1.

Referring to FIG. 3., there is illustrated in greater detail the flash gas filter system 18 and the filter system control 27 which make up the monitoring apparatus according to the present invention. The filter system 18 monitors the condition of the refrigerant in the liquid line and differentiates between flash gas bubbles and low on gas bubbles. This monitoring permits the filter control system 27 to initiate an alarm when the refrigeration system begins to lose refrigerant.

Within the flash gas filter system 18, a sub cooler 30 is installed in the system liquid line between the conduit 19 and the conduit 20. The sub-cooler 30 has a tubular liquid process circuit with an inlet connected to the liquid conduit 17 and an outlet connected to the liquid conduit 20. The refrigerant which enters the sub-cooler 30 through the conduit 17 and exits through the conduit 20 undergoes an approximately 6–10degree temperature drop within the sub-cooler as will be explained below.

A return line removes a small amount of the liquid refrigerant from the conduit 20 and returns that refrigerant to a refrigerating circuit of the sub-cooler 30. A return line conduit 31 has one end connected to receive refrigerant from the liquid line conduit 20 and an opposite end connected to an inlet of a solenoid valve 32. The solenoid valve 32 functions in the same manner as an ordinary mechanical shut-off valve but is electrically actuated by a suitable electronic device (not shown) when the flash gas filter 18 is to be operated.

The refrigerant is discharged from an outlet of the solenoid valve 32 through a conduit 33 to an inlet of a manual expansion valve 34. The manual expansion valve 34 reduces the pressure of the liquid refrigerant prior to passage through a conduit 35 connected between an outlet of the valve 34 and an inlet of the refrigerating circuit of the sub-cooler 30. The manual expansion valve 34 is adjusted with the refrigeration system properly charged and operating under full load conditions to provide a predetermined temperature difference, an approximately 6–10 degree Fahrenheit temperature drop in the refrigerant, between the inlet and the outlet of the liquid process circuit in the sub-cooler 30.

A heat exchange between the refrigerant in the liquid process circuit and the refrigerant in the refrigerating circuit occurs as the sub-cooler functions like the evaporator 25. The heat exchange converts any flash gas present in the refrigerant to liquid form. The removal of the flash gas from the liquid line increases the efficiency of the system 11 because the net pressure drop decreases due to the lower velocity requirements of 100% liquid compared to flash gas laden liquid. Also, the expansion valve efficiency will be improved since the refrigerant supplied to it is free of flash gas. Once the flash gas is depleted, the heat exchange further causes a refrigerating effect resulting in the 6–10 degree temperature drop across the sub-cooler 30.

A pair of temperature transducers 36 and 37 are mounted near the inlet and outlet of the liquid process circuit of the sub-cooler 30 on the conduits 17 and 20, respectively. The transducers 36 and 37 sense the refrigerant temperature and provide temperature input signals on leads connected to inputs of a computer 38 within the filter control system 27. The transducer 36 generates a first temperature signal representing the temperature of the refrigerant entering the sub-cooler 30 from the conduit 17. The transducer 37 generates a second temperature signal representing the temperature of the refrigerant leaving the sub-cooler 30 through the conduit 20. The computer 38 subtracts the inlet temperature from the outlet temperature to determine the temperature drop of the refrigerant passing through the liquid process circuit of the sub-cooler 30.

When the refrigeration system 11 loses refrigerant through a leak or is improperly charged to less than a fully charged state, low on gas bubbles will be generated and will pass through the sub-cooler 30. These heat laden bubbles transfer a small portion of their heat during the heat exchange within the sub-cooler 30. Under normal operating conditions, the refrigerant is properly charged and there is no leakage, only a relatively small amount of heat removal from the refrigerant is required to convert the flash gas back to liquid and the majority of the refrigeration effect results in producing a relatively high $\Delta t$. The conversion of the LOG bubbles to liquid reduces the temperature drop or $\Delta t$ produced by the sub-cooler. As a result, the computer 38 detects the reduction in the temperature difference.

Based upon information inputted from a keyboard 39 connected to the computer 38, the computer 38 will actuate an alarm 40 connected to an output of the computer. The alarm can be actuated at a predetermined temperature difference which can be as low as zero degrees. The alarm 40 includes a suitable means of warning interested persons of the low refrigerant condition such as a siren and/or a flashing light.

A user of the refrigeration system 11 may desire to have the alarm condition temperature difference sensed for a specified length of time to prevent alarm actuations caused by instantaneous fluctuations in refrigerant temperature due the external factors. Such instantaneous fluctuations are self-correcting and do not require maintenance obviating the necessity of alarm actuation. The user is able to specify to the computer 38 through the keyboard 39 the length of time an alarm condition must be sensed before actuating the alarm 40. Such a feature allows the user to best adapt the system 11 to the operating environment.

The compressor status board 28 provides the compressor run status as a signal on a lead 41 connected to an input of the computer 38. In normal operation and during defrosting, the compressor is deactivated for a limited time. The user is able to input to the computer 38 through the keyboard 39 a length of time the compressor can be deactivated before the alarm is actuated. In multiple compressor systems, the compressor status board will determine if one or more of the compressors malfunctions.

The system 11 monitors liquid line temperature. The programmable liquid line temperature alarm provides protection against malfunctioning condensers.

The user is also able to input through the keyboard 39 maintenance information to the computer 38 such as the amount of charge refrigerant supplied to the system 11 and the date the refrigerant was supplied. This information can be retrieved by mechanic who works on the system months or years later. The readily accessible information facilitates the repair to be performed by the mechanic.

The maintenance information enables the computer to predict the source of potential malfunctions. For example, a low ambient temperature can sometimes cause an alarm for low refrigerant level in the system. If there is an alarm in the system and the computer 38 has recently received information of a low ambient air temperature from an external sensor (not shown) which temperature the computer memory indicates is the lowest temperature experienced by the system 11 since the refrigerant was last recharged or adjusted, the computer can display an appropriate informative message to the mechanic indicating the low ambient air temperature is a possible cause of the system 11 low refrigerant alarm.

Figure 4:
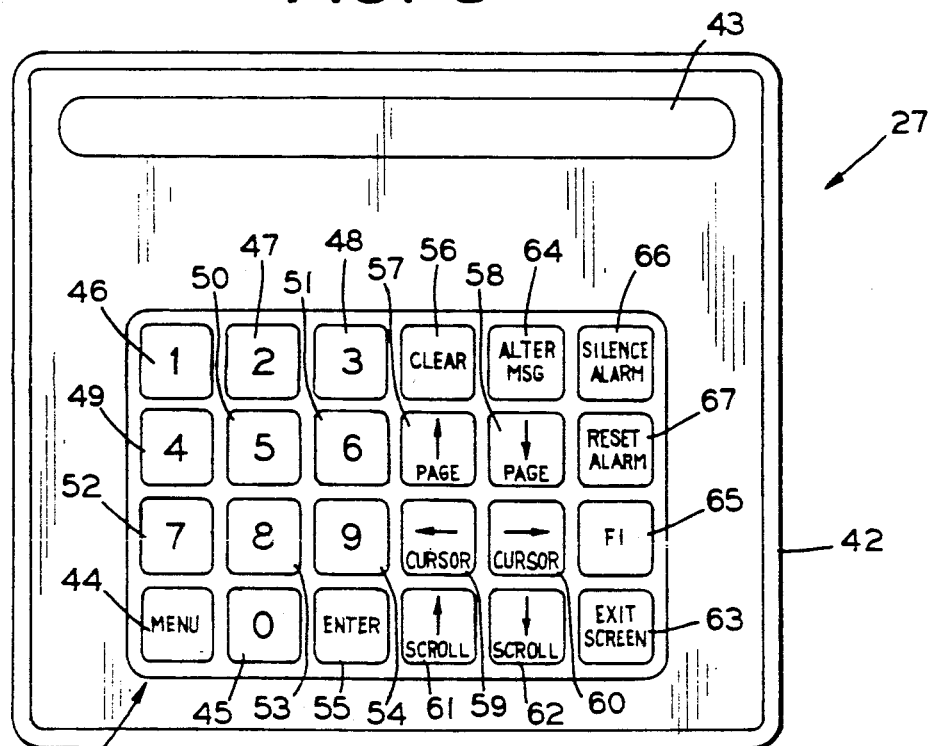
FIG. 4 is a front elevation view of the filter system control shown in FIG. 1.

Referring to FIG. 4, there is illustrated the front panel of the filter system control 27 shown in FIGS. 1 and 3. The control 27 includes a case or cabinet 42 mounting the keyboard 39 and a visual display 43 on the front surface thereof. The keyboard 39 can be of any suitable type, but it is desirable to be able to provide an overlay for special labeling of the keys. The keyboard 39 is shown with twenty-four keys labelled with the numbers zero through nine, and the functions "CLEAR", "ALTER MSG", "SILENCE ALARM", "PAGE" (and an upwardly directed arrow), "PAGE" (and a downwardly directed arrow), "RESET ALARM", "CURSOR" (and a leftwardly directed arrow), "CURSOR" (and a rightwardly pointed arrow), "F1 ", "MENU", "ENTER", "SCROLL" (and an upwardly directed arrow), "SCROLL" (and a downwardly directed arrow) and "EXIT SCREEN". The computer 38 of the filter system control 27 is programmed with various subroutines to perform functions and to provide a readout on the display 43 which corresponds to the functions selected on the keyboard 39.

A "MENU" key 44 allows the user to select from the various subroutines of the user friendly computer software depending on the type of information sought or desired to be input. The zero through nine numbered keys, 45 through 54 respectively, allow the user to input desired numerical information which is shown on the display 43. An "ENTER" key 55 is utilized for signalling the computer 38 to store the information. A "CLEAR" key 56 is utilized to clear the display 43 and information which has not been entered. A pair of "PAGE" keys 57 and 58, a pair of ∓CURSOR" keys 59 and 60 and a pair of "SCROLL" keys 61 and 62 allow the user to move a cursor on the display 43 in the direction of the associated arrows page-by-page, along a line and line-by-line respectively in a subroutine. An "EXIT SCREEN" key 63 allows the user to exit a particular subroutine.

An "ALTER MSG" key 64 allows the user to change or alter a computer generated message which is shown on the display 43. An "F1 " key 65 provides an input means for a function which can be programmed into the computer software if desired by the user. A "SILENCE ALARM" key 66 allows the user to turn off the alarm siren after the warning is noted and while the system maintenance is performed. A "RESET ALARM" key 67 allows the user to reactivate the warning system after the maintenance has been completed.

In summary, a flash gas filter system determines if there is a low refrigerant level in a refrigeration system by measuring the Δt of the input and output temperature sensors mounted on the flash gas filter. The filter system apparatus utilizes a sub-cooler and a manual expansion valve to convert refrigerant flash gas to liquid and produce a predetermined temperature drop across the sub-cooler. The temperature drop of the refrigerant is measured by a pair of transducers which send electric signals to a filter system control. Based on the temperature drop information and system user entered information, the control selectively actuates an alarm. It should be understood that the filter system control 27 can be utilized to monitor a plurality of refrigerant liquid lines, simultaneously, in the manner described above on a time sharing or multiplexed basis. Furthermore, the flash gas filter can be utilized to eliminate the flash gas and any type of detection means can be utilized in place of the temperature sensors to indicate a loss of refrigerant by detecting the low on gas bubbles. Also, the refrigerating circuit of the sub-cooler functions as an evaporator such that, alternatively, it can be incorporated in a separate refrigerating system for providing the required refrigerating effect.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for monitoring a refrigeration system, the system having a compressor with an outlet connected to an inlet of an expansion valve through a condenser by a liquid line, and an evaporator having an inlet connected to an outlet of the expansion valve and an outlet connected to an inlet of the compressor by a suction line, comprising:

a sub-cooler having a liquid process circuit with an inlet for connection to an outlet of a condenser in a refrigeration system and an outlet for connection to an inlet of an expansion valve in the refrigeration system for passing liquid refrigerant from the condenser to the expansion valve, said sub-cooler having a refrigerating circuit with an inlet connected to said liquid process circuit outlet and an outlet for connection to a suction line connected to an inlet of a compressor in the refrigeration system;

a pair of temperature sensor means, one of said sensor means mounted at said liquid process circuit inlet for generating a first temperature signal representing the temperature of refrigerant entering said sub-cooler, and the other of said sensor means mounted at said liquid process circuit outlet for generating a second temperature signal representing the temperature of the refrigerant leaving said sub-cooler; and control means having inputs connected to said temperature sensor means and responsive to a predetermined relationship between said first and second temperature signals for generating an output signal indicating a loss of refrigerant in the refrigeration system including the condenser, the compressor and the expansion valve.

2. The apparatus according to claim 1 including a solenoid valve connected between said liquid process circuit outlet and said refrigerating circuit for selectively passing refrigerant from said liquid process circuit to said refrigerating circuit.

3. The apparatus according to claim 1 including a manual expansion valve (MXV) connected between said liquid process circuit outlet and said refrigerating circuit inlet for reducing the pressure of refrigerant flowing from said liquid process circuit into said refrigerating circuit.

4. The apparatus according to claim 1 wherein said control means includes a computer means for storing a predetermined temperature differential and being responsive to said first and second temperature signals for comparing the difference between the temperatures represented by said first and second temperature signal with said predetermined temperature differential.

5. The apparatus according to claim 1 wherein said control means includes a computer means for storing a predetermined temperature differential and being responsive to said first and second temperature signals for comparing the difference between the temperatures represented by said first and second temperature signal with said predetermined temperature differential and generating an alarm signal when said difference is equal to or less than said differential.

6. The apparatus according to claim 4 wherein said control means includes a keyboard for generating data and command signals to said computer means.

7. The apparatus according to claim 6 wherein said control means includes a display for indicating said data and command signals inputted to said computer means by said keyboard and for indicating information generated by said computer means.

8. The apparatus according to claim 1 wherein said control means includes an alarm means responsive to said control signal for generating an audible alarm signal.

9. The apparatus according to claim 1 wherein said control means includes an alarm means responsive to said control means for generating a visible alarm signal.

10. The apparatus according to claim 9 including a compressor status board connected between said control means and an electrical power circuit for the compressor for generating a compressor run signal to said control means when electrical power is applied to a drive motor of the compressor.

11. A refrigeration system comprising:
a conduit for cycling refrigerant;
a compressor connected to said conduit for compressing gaseous refrigerant, said compressor having an inlet for receiving gaseous refrigerant from said conduit and an outlet for discharging compressed gaseous refrigerant to said conduit;
a condenser connected to said conduit for liquefying compressed gaseous refrigerant, said condenser having an inlet for receiving compressed gaseous refrigerant from said compressor and an outlet for discharging liquid refrigerant to said conduit;
a sub-cooler connected to said conduit, said sub-cooler having a liquid process circuit with an inlet for receiving liquid refrigerant from said condenser and an outlet for discharging liquid refrigerant into said conduit to an expansion valve, said sub-cooler having a refrigerating circuit with an inlet connected to said liquid process circuit outlet and an outlet connected to a suction line connected to said compressor inlet for generating a predetermined temperature drop $\Delta t$ in liquid refrigerant passing through said liquid process circuit;
a first temperature sensor for generating a first temperature signal representing the temperature of refrigerant entering said sub-cooler, said first temperature sensor means mounted at said inlet of said liquid process circuit;
a second temperature sensor for generating a second temperature signal representing the temperature of refrigerant exiting said sub-cooler, said second temperature sensor means mounted at said outlet of said liquid process circuit;
control means having inputs connected to said temperature sensors and being responsive to said first and second temperature signals for generating an output signal indicating a loss of refrigerant flowing in said conduit;
an expansion valve connected to said conduit for reducing the pressure of liquid refrigerant, said expansion valve having an inlet for receiving refrigerant from said sub-cooler and an outlet for passage of refrigerant with a reduced pressure to said conduit; and
an evaporator connected to said conduit for converting reduced pressure liquid refrigerant to gaseous refrigerant, said evaporator having an inlet for receiving reduced pressure liquid refrigerant from said expansion valve outlet and an outlet for passage of said gaseous refrigerant to said compressor inlet via the suction line.

12. The refrigeration system according to claim 11 including a manual expansion valve having an inlet connected to said liquid process circuit outlet and an outlet connected to said inlet of said refrigerating circuit.

13. The refrigeration system according to claim 11 including a solenoid valve connected between said liquid process circuit outlet and said refrigerating circuit inlet for selectively passing refrigerant from said liquid process circuit to said refrigerating circuit.

14. An apparatus for monitoring a refrigeration system, the system having a compressor, a condenser, an expansion valve and an evaporator connected in series by a conduit, comprising:
a sub-cooler having a liquid process circuit with an inlet for connection to an outlet of a condenser and an outlet for connection to an inlet of an expansion value, said sub-cooler having a refrigerating circuit with an inlet for connection to a liquid line portion of a conduit connected between the condenser and the expansion valve and an outlet for connection to a suction line portion of the conduit connected between an evaporator and the compressor, said sub-cooler liquefying flash gas in liquid refrigerant passing through said liquid process circuit;
manual expansion valve (MXV) connected between said liquid process circuit outlet and said refrigerating circuit inlet for generating a temperature difference between a temperature of the refrigerant entering said liquid process circuit and a temperature of the refrigerant leaving said liquid process circuit; and
means for detecting a loss of refrigerant flowing in a conduit connecting the compressor, the condenser and the expansion valve, said means for detecting being responsive to a value of said temperature difference for indicating a loss of refrigerant flowing in the conduit connecting the compressor, the condenser and the expansion valve.

15. The apparatus according to claim 14 including a solenoid valve connected between said liquid process circuit outlet and an inlet of said manual expansion valve (MXV) for selectively passing refrigerant from said liquid process circuit to said refrigerating circuit.

16. The apparatus according to claim 14 including a pair of temperature sensor means, one of said sensor means mounted at said liquid process circuit inlet for generating a first temperature signal representing the temperature of refrigerant entering said sub-cooler, and the other of said sensor means mounted at said liquid process circuit outlet for generating a second temperature signal representing the temperature of the refrigerant leaving said sub-cooler, said means for detecting being responsive to the difference between said first and second temperature signals for indicating the loss of refrigerant.

* * * * *